Dec. 9, 1958  C. F. HETTINGER  2,863,253
COMPOUND SINKER FOR FISHING LINES
Filed Nov. 29, 1955
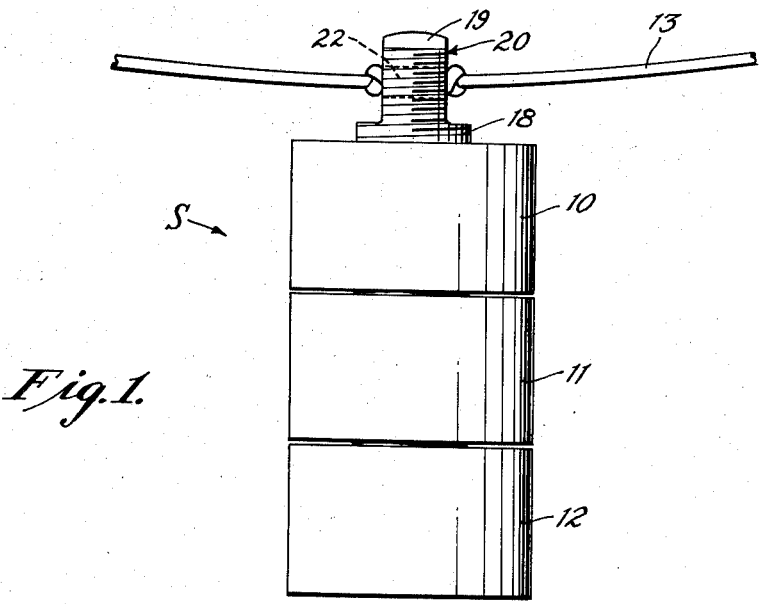
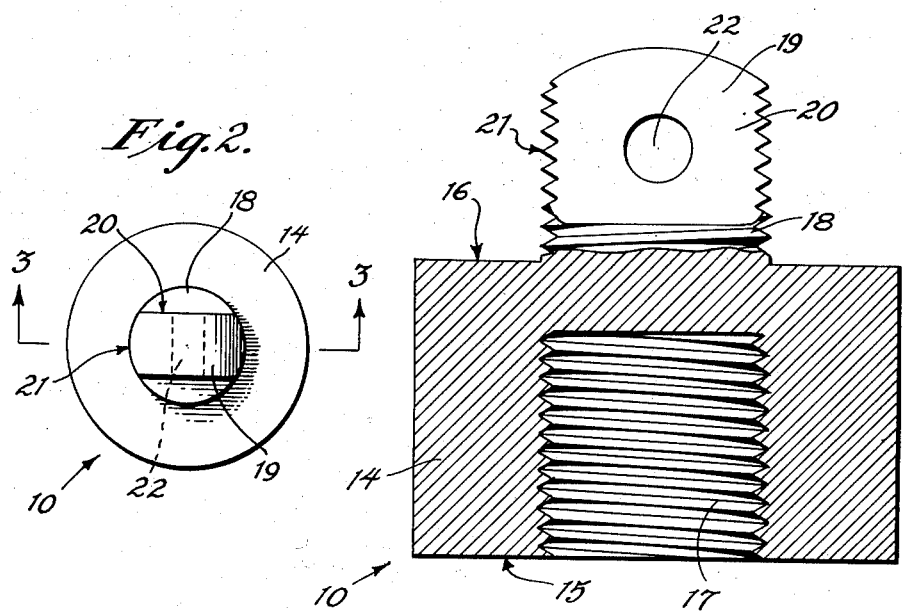
INVENTOR.
CHARLES F. HETTINGER
BY
HIS ATTORNEY.

United States Patent Office 2,863,253
Patented Dec. 9, 1958

2,863,253

COMPOUND SINKER FOR FISHING LINES

Charles F. Hettinger, Merchantville, N. J.

Application November 29, 1955, Serial No. 549,799

1 Claim. (Cl. 43—43.14)

The present invention relates to the sinkers that are commonly employed in conjunction with fishing lines, and is concerned primarily with a compound sinker to which decided advantages attach.

At the present time, just about every sinker that is employed for the purpose of weighing down a fishing line includes an eye through which the line is passed and knotted so as to secure the sinker to the line at the particular point required. It happens that different fishing operations and varying conditions require different weights on the part of a sinker. Thus, when fishing in still water for a certain type of fish, a sinker of one weight is required. When fishing with a strong ebb tide running, a heavier sinker is required. Other conditions could be enumerated which cause the fisherman from time to time to change the sinker on his line.

The changing of a sinker heretofore has been an operation of some little annoyance, due to the fact that each sinker must be completely removed from the line and replaced by another one.

With the foregoing conditions in mind, the present invention has in view as its foremost objective the provision of a compound sinker which will greatly minimize, if not completely eliminate, the undesirable features above outlined.

More in detail, the invention has as an object the provision of a compound sinker comprising a plurality of units, all of which are identical in size, shape, and structure, and which are adapted to be detachably assembled into a single sinker. Each of these units has an ear formed with an opening whereby it is adapted to be secured to a fish line. Thus, any unit may be used individually as a sinker of minimum weight, and one or more units added thereto as occasion demands to provide a sinker of increased weight. An additional unit is attached to the sinker on the line when the increased weight is required, or removed from it when the weight of the sinker is to be reduced. In either case, there is nothing done which involves the connection of the first unit to the line.

Still another object of the invention is to provide, in a compound sinker of the character indicated, a plurality of units, each consisting of a cylindrical metallic body having opposed end faces, with a threaded bore entering the body from one end face and a threaded ear projecting from the body at the other end face. The threaded ear of any unit is adapted to be screwed into the threaded bore or socket of any other unit.

Various other more detailed objects and advantages of the invention, such as arise in connection with carrying out the above-noted ideas in a practical embodiment, will in part become apparent, and in part be hereinafter stated, as the description of the invention proceeds.

The invention, therefore, comprises a compound sinker for fish lines which consists essentially of a plurality of units all of identically the same size and shape, with each unit comprising a cylindrical metallic body having opposed end faces, with a threaded bore entering the body from one end face and a threaded ear projecting from the other end face, with the ear being formed with an aperture to receive a fish line. The threaded ear of any unit is adapted to be screwed into the threaded bore of any other unit to assemble said units.

For a full and more complete understanding of the invention, reference may be had to the following description and accompanying drawing, wherein:

Figure 1 is a view in side elevation of a compound sinker designed in accordance with the precepts of this invention.

Figure 2 is a top plan view of one of the units making up the compound sinker; and Figure 3 is a detailed transverse section taken on the plane represented by the line 3—3 of Figure 2 with parts in elevation.

Before referring to the drawing, it is to be clearly understood that each unit hereinafter described may be made from any appropriate metal having a high specific gravity, such as lead or bronze, and may be either molded in a single piece or comprise a fabricated structure. Thus, the parts which are threaded could be made of brass or bronze, and a lead body molded thereabout.

Referring now to the drawing, a sinker is referred to in its entirety by the reference character S. The sinker S, as illustrated, comprises three units 10, 11, and 12 which are detachably secured together, with the unit 10 shown as secured to a fish line 13 by a structure to be later described in detail. The units 10, 11, and 12 are all of substantially the same size and shape, and of like construction; hence, only one of them is herein described in detail, as that is believed to be sufficient for the purposes of this specification. Referring now more particularly to Figures 2 and 3, the unit 10 is shown as comprising a cylindrical body 14 having end faces 15 and 16. Entering the body 14 from the end face 15 is a threaded bore or socket 17.

Upstanding from the end face 16 is a threaded pedestal 18 which is fully circular and from which projects an ear 19 having opposed flat faces 20 and curved side walls 21 which are threaded, with the threads being continuations of the threads on the pedestal 18. Extending between the flat faces 20 is an aperture 22 which receives a fish line such as shown in 13 of Figure 1.

While the mode of operation and manner of using the compound sinker of this invention is believed to be obvious from the illustration of the drawing and description of parts given, it may be briefly outlined as follows:

Let us first assume that a sinker having the weight of three units is required. Such a sinker is shown at S in Figure 1 of the drawing.

The unit 11 is assembled on the unit 10 by screwing the ear 19 and pedestal 18 of the unit 11 into the threaded socket 17 of the unit 10. The unit 12 is then assembled on the unit 11 in a similar manner. The fish line 13 is then passed through the aperture 22 of the unit 10 and knotted in accordance with accepted fisherman practice. The sinker is now ready for use.

When occasion arises that a sinker of lesser weight is required, all that is necessary is to remove the unit 12 from the unit 11 by unscrewing the ear 19 and pedestal 18 from the socket 17. This operation in no way disturbs the connection of the unit 10 to the fish line 13. It is evident that units may be added to or taken away from the sinker S without involving the connection of the line 13 in any manner whatsoever.

While a preferred specific embodiment of the invention is hereinbefore set forth, it is to be clearly understood that the invention is not to be limited to the exact constructions, mechanisms, and designs illustrated and described, because various modifications of these details may be provided in putting the invention into practice within the purview of the appended claim.

What is claimed is:

In a compound sinker for fish lines, a plurality of units in assembled relation, each of said units comprising a cylindrical body having open end faces, said body being formed with a threaded socket entering thereinto from one end face, a circular exteriorly threaded pedestal on the other end face, and an ear having opposed flat faces projecting from said pedestal and formed with an aperture extending between said flat faces, said ear having curved side edges formed with threads that are continuations of the threads on said pedestal.

References Cited in the file of this patent

UNITED STATES PATENTS

| | | |
|---|---|---|
| 273,238 | Johnston | Feb. 27, 1883 |
| 402,231 | Coles | Apr. 30, 1889 |
| 549,332 | Sewell | Nov. 5, 1895 |
| 717,681 | Hodge | Jan. 6, 1903 |
| 2,157,003 | Mussina | May 2, 1939 |
| 2,228,513 | Frisbie | Jan. 14, 1941 |